United States Patent
Agin et al.

(10) Patent No.: US 8,287,827 B2
(45) Date of Patent: Oct. 16, 2012

(54) PROCESS FOR THE HYDROMETALLURGICAL TREATMENT OF A LATERITIC NICKEL/COBALT ORE AND PROCESS FOR PRODUCING NICKEL AND/OR COBALT INTERMEDIATE CONCENTRATES OR COMMERCIAL PRODUCTS USING IT

(75) Inventors: Jérôme Agin, Paris (FR); Yves Le Quesne, Rambouillet (FR); Bertrand Berthomieu, Rambouillet (FR)

(73) Assignee: Eramet, Paris (FR)

( * ) Notice: Subject to any disclaimer, the term of this patent is extended or adjusted under 35 U.S.C. 154(b) by 0 days.

(21) Appl. No.: 12/440,087

(22) PCT Filed: Aug. 22, 2007

(86) PCT No.: PCT/FR2007/001389
§ 371 (c)(1),
(2), (4) Date: Nov. 30, 2009

(87) PCT Pub. No.: WO2008/029009
PCT Pub. Date: Mar. 13, 2008

(65) Prior Publication Data
US 2010/0098608 A1   Apr. 22, 2010

(30) Foreign Application Priority Data
Sep. 6, 2006 (FR) ................................ 06 07816

(51) Int. Cl.
*C22B 23/00* (2006.01)
(52) U.S. Cl. ........ 423/140; 423/141; 423/142; 423/143; 423/150.1; 423/150.4
(58) Field of Classification Search .......... 423/140–143, 423/150.1, 150.4
See application file for complete search history.

(56) References Cited

U.S. PATENT DOCUMENTS

| 3,793,432 A | 2/1974 | Weston |
| 4,410,498 A | 10/1983 | Hatch et al. |
| 4,541,868 A | 9/1985 | Lowenhaupt et al. |
| 6,261,527 B1 | 7/2001 | Arroyo et al. |
| 6,379,636 B2 * | 4/2002 | Arroyo et al. ................. 423/141 |
| 6,379,637 B1 | 4/2002 | Curlook |
| 6,680,035 B2 | 1/2004 | Arroyo et al. |

(Continued)

FOREIGN PATENT DOCUMENTS
EP   1 777 304   4/2005
(Continued)

OTHER PUBLICATIONS

Stopic S et al, "Sulpheric Acid leaching of the Serbian Nickel Lateritic Ore" Erxmettal, GMBD—Medienverlag, Clausthal-Zellerfeld, DE, vol. 56, No. 4, 2003, pp. 204-209.

(Continued)

*Primary Examiner* — Steven Bos
(74) *Attorney, Agent, or Firm* — B. Aaron Schulman, Esq.; Stites & Harbison PLLC

(57) ABSTRACT

Process for the treatment of a lateritic nickel/cobalt ore consisting of a mixture (2) of limonite and saprolite, characterized in that: the mixture (2) in the presence of an iron-precipitating agent is made into a pulp (1), having a solids content of between 10 and 40% by weight; the pulp undergoes a leaching operation (4) with sulphuric acid (5), at a temperature between 70° C. and the boiling point and at atmospheric pressure; and a solid-liquid separation (8) is carried out so as to obtain an iron-containing solid residue (9) and a solution containing nickel and cobalt ions. Process for producing nickel and/or cobalt intermediate concentrates or commercial products using the above process.

27 Claims, 3 Drawing Sheets

U.S. PATENT DOCUMENTS

| | | | |
|---|---|---|---|
| 7,416,711 | B2 | 8/2008 | Liu et al. |
| 2002/0006370 | A1 | 1/2002 | Arroyo et al. |
| 2006/0002835 | A1* | 1/2006 | Neudorf .................. 423/140 |

FOREIGN PATENT DOCUMENTS

| | | |
|---|---|---|
| EP | 1 731 622 | 12/2006 |
| EP | 1 731 623 | 12/2006 |
| FR | 2 459 295 | 1/1981 |
| JP | 2003 183746 | 5/2003 |

OTHER PUBLICATIONS

Agatzini-Leonardou S et al, "Benefication of a Greek Serpentinic Nickeliferous Ore Part II. Sulpheric Acid Heap and Agitation Leaching", Hydrometallurgy, Elsevier Scientific Publishing Cy, Amsterdam NL, vol. 74, No. 3-4, (Oct. 2004), pp. 267-275.

"Nickel Laterites: To Squeeze or Not to Squeeze?", Mining Journal, Mining Journal Ltd., London GB, vol. 338, 2002, p. 7.

* cited by examiner

PROCESS FOR THE HYDROMETALLURGICAL TREATMENT OF A LATERITIC NICKEL/COBALT ORE AND PROCESS FOR PRODUCING NICKEL AND/OR COBALT INTERMEDIATE CONCENTRATES OR COMMERCIAL PRODUCTS USING IT

The invention relates to the hydrometallurgical treatment of nickel and cobalt oxide ores so as to obtain a solution containing, in particular, the nickel and cobalt extracted from the ores, which solution may then be treated in order to recover the nickel and/or cobalt in the form of intermediate concentrates or commercial products.

Nickel and cobalt ores are divided into various categories. One of the main categories is "oxide" or "lateritic" ores in which the nickel and cobalt are in the form of oxides and are present in the form of two fractions arranged in superimposed layers:
- a "limonite" (or sometimes "laterite") fraction which is relatively low in magnesium and relatively high in iron;
- a "saprolite" fraction which, conversely, is relatively high in magnesium and relatively low in iron.

Various hydrometallurgical processes for obtaining said nickel and cobalt solution before their recovery in metal form have been suggested. The most conventional process is the "Moa Bay" process in which a pulp having 40% solids of an ore consisting substantially of limonite is leached in sulphuric acid at 245 to 270° C. and 35 to 55 bar and then undergoes solid-liquid separation and neutralisation of the free acid at atmospheric pressure. The iron and aluminium remaining in solution are precipitated by adding crushed limestone (historically from coral mud). The nickel and cobalt are recovered from the solution by precipitating sulphurs.

A drawback of this process is that the presence of both limonite and a significant fraction of saprolitic ore, which is largely basic owing to its high concentration in magnesium, results in increased acid consumption.

Solutions obtained using this process have been proposed with a view to treating, as well as possible, the various types of lateritic ore or their fractions with as little acid consumption as possible and/or without the use of expensive autoclaves which are not very reliable and must be used when working at high pressure.

In particular, document U.S. Pat. No. 3,793,432 may be cited which suggests leaching only limonite with sulphuric acid at a pH lower than 1.5 whilst adding agents which induce the precipitation of iron within a jarosite precipitate. This leaching process takes place at atmospheric pressure but requires an extremely long treatment time (40 to 100 hours) in order to obtain a good extraction of nickel and sufficient iron precipitation.

It is suggested in document U.S. Pat. No. 4,410,498 to leach only saprolite with sulphuric acid at atmospheric pressure whilst adding a reducing agent which keeps the redox potential of the bath at 400 to 600 mV.

Documents U.S. Pat. No. 6,261,527 and U.S. Pat. No. 6,680,035 suggest first leaching a limonite fraction at atmospheric pressure in order to dissolve the iron and nickel, then adding an iron-precipitating agent so as to obtain jarosite precipitation and, at the same time, neutralising the pulp using saprolite so as to maintain a concentration of free $H_2SO_4$ of from 5 to 15 or from 5 to 30 g/l in the liquid phase. The final solution has an iron content of less than 3 g/l or of less than 10 g/l based on the amount of iron-precipitating agent added.

One way of adding this iron-precipitating agent, in the case of $Na^+$ ions, is to make the limonite and saprolite into a pulp using sea water. If this is the only source of iron-precipitating agent then only the upper part of the range of iron contents of less than 10 g/l as mentioned above can be obtained.

This process, known as JAL (jarosite atmospheric leaching), has the advantage of yielding good results in terms of the composition of the final leaching solution and does not require the use of equipment which is rather expensive or unreliable (autoclaves) in order to carry out the hydrometallurgical part of the process. However, as before, selective mining or treatment before the limonite and saprolite fractions are separated from a lateritic ore is required.

However, for some deposits, it is difficult to carry out this separation process effectively, either owing to the thinness of the limonite and saprolite layers or owing to the complicated geometry of their interface. There are also extremely ferriferous saprolites in some deposits and it is not known how to effectively separate these from limonites by means of mining. These saprolites are superimposed by less ferriferous saprolites containing more magnesium. Lastly, some deposits have been remobilised (for example by mass sliding towards low regions) and the various types of ore mixed during displacement cannot be separated effectively.

Whilst it is possible (and this is not always the case), this separation process is thus difficult and its cost substantially affects the cost of mining, mineral processing and hydrometallurgical treatment of the nickel and cobalt ores carried out with a view to recovering these metals.

The object of the invention is to propose a new process for the hydrometallurgical treatment of a lateritic nickel and cobalt ore, the use of which makes it possible to obtain, from a wide range of lateritic ores, nickel and cobalt intermediate concentrates or commercial products having a high level of purity at a satisfactory cost.

The invention thus relates to a process for the hydrometallurgical treatment of a lateritic nickel and cobalt ore formed of a mixture of limonite and saprolite, characterised in that:
- the limonite and saprolite mixture is made into a pulp in the presence of an iron-precipitating agent so as to form an initial pulp having a solids content of between 10 and 40% by weight, preferably between 20 and 30%;
- the limonite and saprolite starting pulp is leached with sulphuric acid at a temperature between 70° C. and the boiling point of the solution, preferably between 90° C. and the boiling point, at atmospheric pressure;
- the pulp obtained from the leaching process is optionally neutralised so as to obtain a pH of between 2 and 3;
- a solid-liquid separation process is carried out on said pulp, preferably via decantation and counter-current washing or filtration, so as to obtain an iron-containing solid residue, mainly in the form of jarosite, and a solution containing nickel and cobalt ions;
- the saprolite/limonite ratio of the mixture is preferably between 0.5 and 3;
- the retention time of the pulp during the leaching process with sulphuric acid is preferably between 1 and 24 h, preferably between 6 and 12 h;
- the amount of sulphuric acid added whilst the pulp is leached is preferably such that the concentration of sulphuric acid in the pulp after the leaching process is from 10 to 50 g/l, preferably from 20 to 40 g/l;

According to a variation of the invention, the saprolite/limonite ratio of the mixture makes it possible to obtain, after a first step of the leaching process thereof, a concentration of sulphuric acid of 25 to 50 g/l and, furthermore, saprolite is separately made into a pulp having a solids content of between 10 and 40% by weight, preferably between 20 and 30%. Said saprolite pulp is added to the saprolite and limonite pulp during the leaching process so as to proceed with a second step of said leaching process for between 5 and 8 h at a temperature between 70° C. and the boiling point of the solution, preferably between 90° C. and the boiling point, the concentration of sulphuric acid in the pulp after the second step of the leaching process being between 10 and 50 g/l, preferably between 20 and 40 g/l, before proceeding with said optional neutralisation process and said solid-liquid separation process.

The retention time of the initial limonite and saprolite pulp during the first step of the leaching process is preferably between 1 h and 8 h, preferably between 4 and 6 h.

The leaching process is preferably carried out in the presence of a reducing agent, such as $SO_2$, keeping electrochemical potential lower than or equal to 1,000 mV relative to the standard hydrogen electrode.

The initial limonite and saprolite pulp is preferably leached in the presence of jarosite seeds.

The seed/ore ratio is preferably between 0 and 2, more preferably between 0.2 and 0.6.

Said seeds are preferably formed by the solid fraction obtained during the solid-liquid separation of some of the pulp obtained from said leaching process, preferably in a decanter.

Said solid fraction obtained by said separation process preferably has a solids content of at least 30%.

Said seeds may result from the filtration of said solid fraction obtained by said separation process.

The iron-precipitating agent is preferably selected from $Na^+$, $K^+$ and $NH_4^+$.

The iron-precipitating agent is preferably added, at least in part, using sea water so as to make the limonite and saprolite mixture into a pulp and/or to make the saprolite into a pulp.

The invention also relates to a process for preparing nickel and/or cobalt intermediate concentrates or commercial products from a lateritic ore, characterised in that:
the hydrometallurgical treatment of said lateritic ore is carried out as explained above;
said solution containing nickel and cobalt ions undergoes processes to purify and recover the nickel and/or cobalt in the form of intermediate concentrates or commercial products.

As will have been understood, a substantial difference between the processes of the prior art disclosed in U.S. Pat. No. 6,261,527 and U.S. Pat. No. 6,680,035 and the processes according to the invention is that, in the invention, is not necessary to first separate the lateritic ore into a limonite fraction having a relatively high content of iron and a relatively low content of magnesium and a saprolite fraction having a relatively low content of iron and a relatively high content of magnesium. A pulp of lateritic ore containing a high saprolite fraction may be directly treated by means of atmospheric leaching with sulphuric acid without it therefore being necessary to use high temperatures and high pressures during the leaching process. The total cost for treating an ore of this type may thus be reduced substantially with a recovery yield of nickel which is still competitive and is even the same as that which can be obtained using the processes of the prior art mentioned above. A variety of lateritic ores for which the processes to effectively separate them into limonite and saprolite would be too difficult and/or too expensive can thus be treated at a satisfactory cost.

If a source of saprolite is also available it is possible to improve the performances of the process by adding a saprolite pulp to the initial pulp during the leaching process thereof. The only additional reactor necessary for implementing this variation is that in which the saprolite is made into a pulp and is therefore of very simple construction. The increase in the cost of the process resulting from said variation thus remains extremely reasonable, all the more so since it makes it possible to shorten the total duration of the leaching operation. The total duration of the process thus remains comparable to that of the standard process.

The initial limonite and saprolite pulp is preferably leached in the presence of jarosite-containing seeds. These seeds are preferably obtained whilst the process itself is carried out, for example by means of a solid-liquid separation process carried out on some of the pulp obtained by the leaching process.

By carrying out the pulping processes with sea water it is possible to introduce, at a low cost, an iron-precipitating agent in the case of $Na^+$ ions. Thanks to this agent, the iron present in the solution once the ores have been leached with sulphuric acid will precipitate in the jarosite. The amount of $Na^+$ ions introduced by the sea water in the conditions described for the pulping processes is sufficient to obtain iron precipitation which leaves in the final solution a dissolved amount of iron which is more generally considered as at least acceptable. If it is sought to obtain a final solution containing very little iron, one or more iron-precipitating agents (compounds containing $Na^+$, $K^+$ and $NH_4^+$ ions, etc.) may specifically be added to the pulps, or the pulping processes may be carried out with soft water together with a suitable amount of one or more of said agents. It is also favourable to neutralise the pulp resulting from the leaching process so as to obtain a pH of from 2 to 3 in order to obtain a very low iron content in the final solution.

The invention will be better understood upon reading the following description, given with reference to the following appended figures, in which.

It should first be noted that in the text below the following definitions are to be applied to specific terms, of which the exact meaning is not always the same within the technical literature:
limonite: ore fraction containing from 50 to 70% $Fe_2O_3$ and at most 5% MgO;
saprolite: ore fraction containing from 7 to 27% $Fe_2O_3$ and at least 10% MgO.

Figure 1:
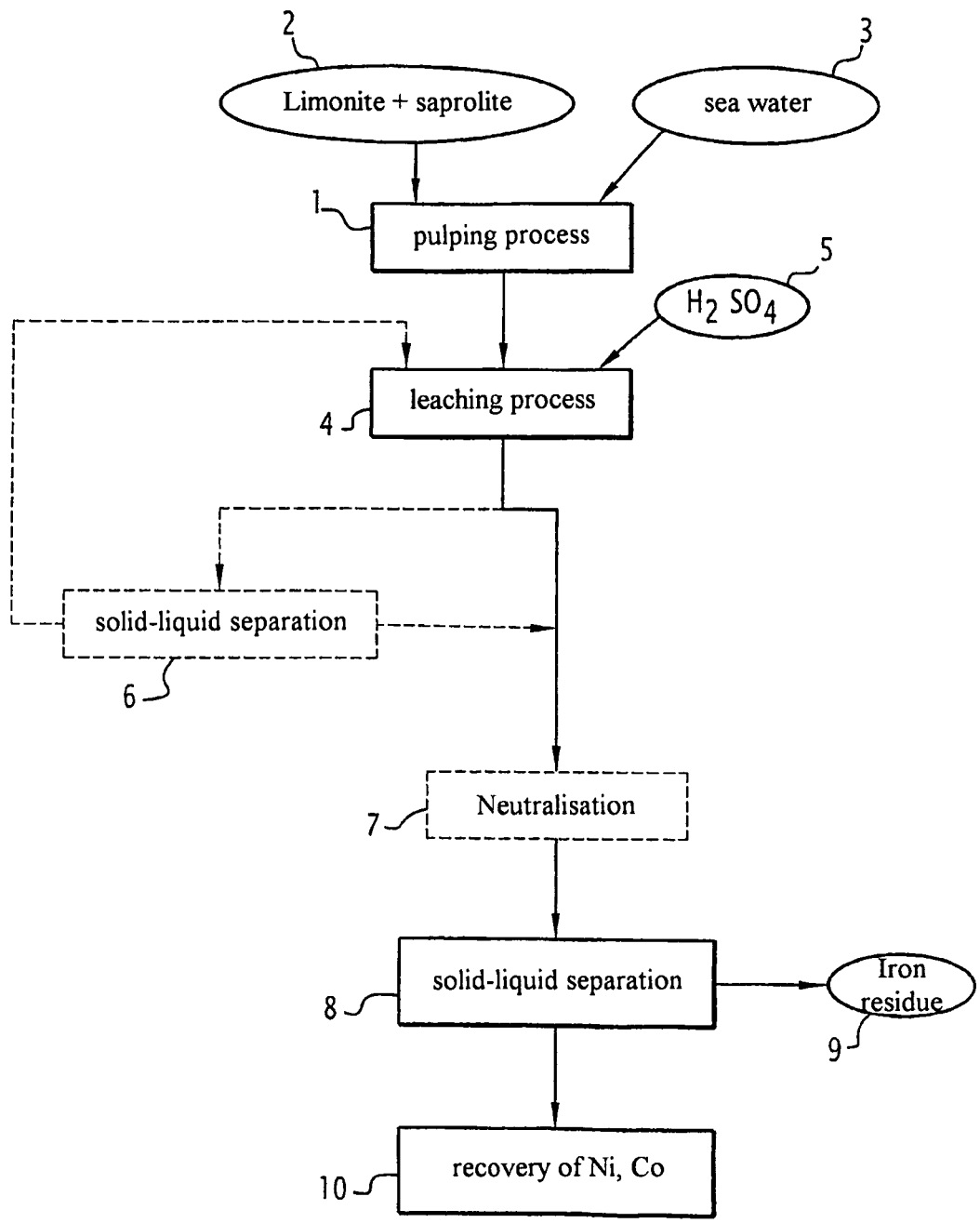
FIG. 1 is a diagram showing a first version of the process according to the invention.

FIG. 1 shows the standard version of the process according to the invention which will be referred to hereinafter as "version 1".

In a first step a limonite and saprolite mixture 2 is made into a pulp with sea water 3. This limonite and saprolite mixture 2 is preferably a lateritic nickel ore of which the fractions containing high and low amounts of magnesium have not been separated. The saprolite/limonite ratio is preferably between 0.5 and 3. This pulping process makes it possible to obtain a solids content of between 10 and 40% by weight, preferably between 20 and 30%.

In a second step 4 the pulp obtained in the first step 1 is leached with sulphuric acid 5. This leaching process 4 is carried out at atmospheric pressure and at a temperature between 70° C. and the boiling point of the solution, preferably between 90° C. and the boiling point, a high temperature promoting the dissolution of the elements to be leached. In the case of this process it is therefore possible to dispense with complex and expensive equipment which is not always reliable, such as the autoclaves conventionally used for leaching processes at high temperature and high pressure which are required by some other processes for treating nickel ores. The retention time of the pulp during the leaching process 4 is generally between 1 h and 24 h, preferably between 6 and 12 h. The time may be optimised as a function of various technical and cost parameters of the process in order to obtain a dissolution of nickel which is as complete as possible and a treatment duration which is not excessively long. The amount of sulphuric acid added is preferably the amount necessary so that, at the end of the entire process, the concentration of sulphuric acid is from 10 to 50 g/l, preferably from 20 to 40 g/l so as to obtain a good compromise between a high leaching yield of nickel and a low content of soluble iron in the leaching solution. It is also known in other processes to impose electrochemical potential lower than or equal to 1000 mV relative to the standard hydrogen electrode to the solution. In fact, in lateritic ores, a preponderant fraction of cobalt is included in the manganese oxide compounds, of the asbolite type, and the cobalt is released when the manganese is rendered soluble by reducing the valence IV to the valence II. However, if it is not sought in particular to optimise the process for leaching cobalt, it is not necessary to impose electrochemical potential. Electrochemical potential is imposed by adding a reducing agent, for example by means of $SO_2$ insufflation. A solid fraction containing jarosite, which in turn contains most of the iron initially present in the mixture 2, is precipitated, it being undesirable for there to be a high content of said iron in the final solution on which the processes for recovering nickel and/or cobalt will be carried out.

Preferably but not obligatorily (this process is therefore shown with a dashed line in FIG. 1), the leaching process 4 is carried out after adding a jarosite-containing leaching residue seed to the pulp so as to quickly induce jarosite precipitation in the solid fraction. The seed/ore ratio by weight is preferably from 0 to 2, more preferably from 0.2 to 0.6 so as to obtain the desired effect at a low cost. This ratio is a parameter which may be changed so as to finely optimise the process of the invention depending on the exact composition of the initial ore. A preferred way of obtaining this seed consists, as shown in FIG. 1, in carrying out a solid-liquid separation process 6 on a fraction of the pulp obtained by the leaching process 4, preferably in a decanter, and in returning the underflow to the leaching reactor. This underflow preferably has a solids content of at least 30% by weight, it being beneficial for thickening to be as high as possible so as to limit the amount of liquid recycled for leaching. Filtering the pulp of the underflow makes it possible to obtain a rather high solids content.

The overflow liquid of the separation process 6 is optionally added to the pulp obtained by the leaching process 4 which then optionally undergoes a step of neutralisation 7 using a neutralising agent such as finely ground limestone in order to bring its final pH to between 2 and 3, preferably approximately 2.5, so as to minimise the soluble iron content and to avoid co-precipitation of some of the cobalt and nickel.

Lastly, the pulp undergoes a solid-liquid separation process 8, preferably by decantation and counter current washing or by filtration. A residue 9 which is substantially free of soluble cobalt and nickel and which contains, in particular, substantially all the iron which was initially present in the initial ore is obtained as well as a solution containing nickel and cobalt ions which have been rendered soluble and of which the iron content, if the optional neutralisation process 7 has not been carried out, is typically from approximately 4 to 30 g/l, preferably from 4 to 15 g/l. The neutralisation process 7 may lower this iron content to less than 1 g/l.

This solution may then undergo conventional recovery processes 10 for recovering nickel and/or cobalt with a view to isolating at least one of these elements in the form of an intermediate concentrate or a commercial product of the conventional type. In particular, processes using sulphate are indicated. Since these processes are conventional and the earlier steps of the process according to the invention do not particularly interfere with them it is not necessary to describe them here in more detail.

Figure 2:
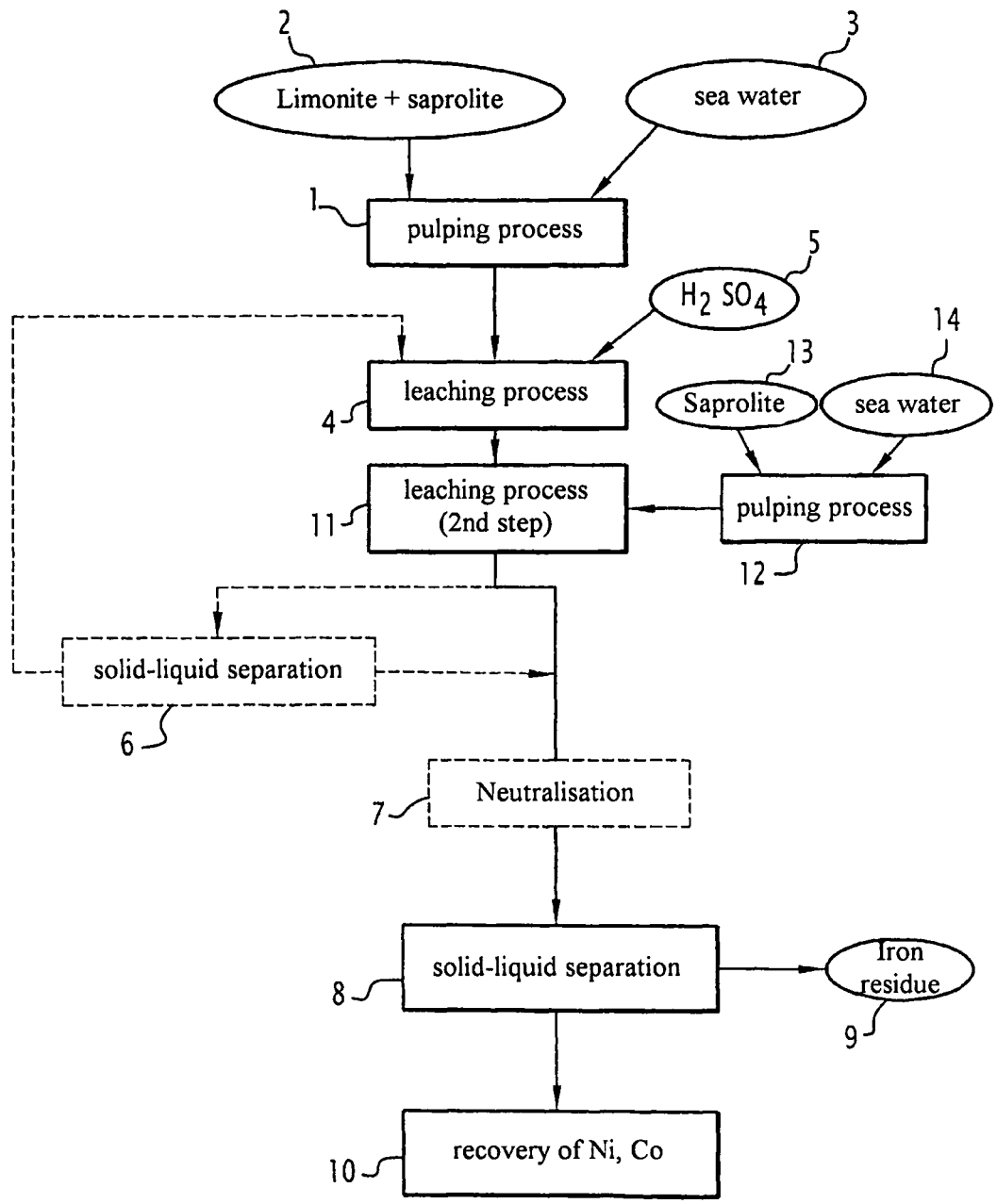
FIG. 2 is a diagram showing a second version of the process according to the invention.

FIG. 2 shows a diagram of a variation of the process according to the invention which will be referred to hereinafter as "version 2". It differs from version 1 mainly in that the leaching process is carried out in two steps, the second step being initiated by adding a saprolite pulp whilst the initial pulp is being leached.

The first step 1 of making a limonite and saprolite mixture into a pulp with sea water 3 is carried out as in version 1 and a solids content in the pulp of from 10 to 40%, preferably from 20 to 30% is obtained.

However, the criterion for determining the saprolite/limonite ratio is different: in this case, a ratio is set which, at the end of the first step of the leaching process 4, allows a relatively high concentration of sulphuric acid, of from 25 to 50 g/l, thus providing the leaching yields of nickel and cobalt.

The pulp is then leached in two steps 4 and 11. The first step 4 is comparable to the leaching process 4 in a single step of version 1, in that it is also carried out at atmospheric pressure and at a temperature between 70° C. and the boiling point of the solution, preferably between 90° C. and the boiling point, and potential lower than or equal to 1000 mV relative to the standard hydrogen electrode is imposed if it is sought to optimise the process for leaching cobalt.

This time, the amount of sulphuric acid 5 added is such that after the second step 11 of the leaching process, which will be described later, the concentration of sulphuric acid is from 10 to 50 g/l, preferably from 20 to 40 g/l.

This first step 4 of the leaching process generally lasts from 1 to 8 h, preferably from 4 to 6 h.

While the limonite/saprolite mixture is made into a pulp 1 and the first step 4 of the leaching process is carried out, a saprolite fraction 13 is also made into a pulp 12 with sea water 14 so as to obtain a solids content in the pulp of from 10 to 40%, preferably from 20 to 30%.

When the first step 4 of the leaching process has progressed to the point at which the sulphuric acid content in the pulp has reached from 25 to 50 g/l, the saprolite pulp resulting from the pulping process 12 is then added to the leached pulp, there being no need to add any more sulphuric acid at this point, except to correct a possible unintentional deviation from the process. A second step 11 of the leaching process thus begins but is carried out at atmospheric pressure and at a temperature between 70° C. and the boiling point of the solution, preferably between 90° C. and the boiling point. Said step 11 lasts for between 5 and 8 h. It yields a final leached pulp, of which the solid fraction contains jarosite, which in turn contains most of the iron initially present in the initial limonite/saprolite mixture 2, and the added saprolite 13.

This pulp then undergoes the same optional processes of neutralisation 7, solid-liquid separation 8 and recovery of the nickel and/or cobalt 9 as in version 1.

As in version 1, the leaching process 4, 11 is preferably carried out in the presence of a jarosite-containing seed. It is added to the pulp before the first step 4 of the leaching process, again with a preferred seed/ore ratio by weight of from 0 to 2, more preferably from 0.2 to 0.6. This nucleus is advantageously obtained by means of a solid-liquid separation process 6 carried out on a fraction of the pulp obtained by the second step 11 of the leaching process. Again, the underflow resulting from this separation process 6 preferably has a solids content of at least 30% and it is the underflow (or the pulp obtained by the filtration thereof) which is sent to the leaching reactor.

The liquid overflow resulting from this separation process 6 is added to the pulp obtained by the second step 11 of the leaching process with a view to undergoing either a neutralisation process 7 (if this is to take place) or with a view to immediately undergoing the solid-liquid separation process 8.

Version 2, in comparison to version 1, makes it possible to increase the leaching yields of nickel and cobalt. This is also the object of adding jarosite-containing seeds to the initial limonite and saprolite pulp before it undergoes a leaching process 4. This addition makes it possible to accelerate the rate of jarosite precipitation and to reduce the amount of sulphuric acid necessary to obtain the desired leaching yields for a given iron content in the final solution. In fact, jarosite precipitation results in an amount of acid being released which is then available to further dissolve the nickel and cobalt.

Laboratory test procedures and the results thereof will now be described with reference to different variations of the process according to the invention.

In a first set of tests (numbered 1 to 5) versions 1 and 2 of the process according to the invention were followed but without the deliberate introduction of jarosite-containing seeds during the leaching process.

The tests were carried out on typical ores obtained from New Calcdonia and of which the main features are given in table 1.

The main operating conditions are summarised in table 2.

TABLE 1 composition of the test ores.

| ore | Ni % | Co % | Fe % | Mg % | Si % | Al % | Mn % | Cr % |
| --- | --- | --- | --- | --- | --- | --- | --- | --- |
| limonite | 1.29 | 0.29 | 41.9 | 2.34 | 3.8 | 2.51 | 1.63 | 2.12 |
| saprolite | 1.68 | 0.03 | 11.4 | 15.3 | 20.3 | 0.27 | 0.19 | 0.48 |

TABLE 2 operating conditions for the first set of tests.

| Test | Process | Approximate limonite/saprolite ratio | $H_2SO_4$ (g/g of dry ore) |
| --- | --- | --- | --- |
| 1 | version 1 | 1:1 | 0.77 |
| 2 | version 1 | 1:1 | 0.80 |
| 3 | version 1 | 1:1 | 0.87 |
| 4 | version 1 | 1:2 | 0.89 |
| 5 | version 2 | 1:2 | 0.83 |

With regard to test 5, acidity is considered relative to the total amount of ore added in the two steps of the leaching process. Refer to the detailed description of the test for more details.

Test No. 1: Version 1—Leaching Limonite and Saprolite at a Ratio of 1:1

A mixture of 269 g dry limonite and 281 g dry saprolite was added to 1620 ml sea water containing 11 g/l Na in a thermostatically controlled 2-liter double envelope reactor equipped with a reflux system. 443 g 96% sulphuric acid were slowly added to the mixture of ores in the form of a pulp, that is to say 0.77 g $H_2SO_4$/g dry ore. The reactor was equipped with a system for outgassing sulphur dioxide and a system for measuring redox potential using an Ag/AgCl electrode. It was rotated at 318 rpm in order to stir the pulp.

The reaction medium was brought to a temperature between 95° C. and the boiling point for the duration of the test. After 30 minutes of reaction, the potential of the pulp was checked at approximately 650 mV Ag/AgCl at most by adding $SO_2$ for approximately 5 h. The evolution of potential was as follows:

| | Time | | | | |
| --- | --- | --- | --- | --- | --- |
| | 0 h | 0.3 h | 0.6 h | 5.8 h | 24 h |
| Potential (Ag/AgCl) | 1016 mV | 977 mV | 650 mV | 570 mV | 523 mV |

A sample taken at 5.8 h showed that the leachate contained 3.8 g/l Ni, 0.51 g/l Co and 34 g/l Fe, that is to say leaching yields of approximately 70% for Ni, 92% Co and a precipitation of 28% for Fe.

After the test, the reaction mixture, which consisted of 1930 ml pulp, was then filtered; 1300 ml of filtrate was recovered with 4.7 g/l Ni and 0.51 g/l Co, 7.7 g/l Fe and 39 g/l $H_2SO_4$. The filter cake was washed over a filter and dried at a constant weight. 551 g dry residue, that is to say 1.00 g dry residue/g dry ore was recovered.

The leaching yields were: 86.6% for Ni, 92.4% for Co and 8% for Fe.

Test No. 2: Version 1—Leaching Limonite and Saprolite at a Ratio of 1:1

A mixture of 333 g dry limonite and 333 g dry saprolite was added to 2000 ml sea water containing 11 g/l Na in the same reactor as before and stirred under the same conditions. 557 g 96% sulphuric acid were slowly added to the ore mixture in the form of a pulp, that is to say 0.80 g $H_2SO_4$/g dry ore.

The reaction medium was brought to a temperature between 95° C. and the boiling point for the duration of the test. After 15 minutes, the potential of the pulp was checked at approximately 650 mV Ag/AgCl at most by adding $SO_2$ for approximately 5 hours. The evolution of potential was as follows:

| | Time | | | | | | |
| --- | --- | --- | --- | --- | --- | --- | --- |
| | 0 h | 0.5 h | 1 h | 2 h | 8 h | 16 h | 28 h |
| Potential (Ag/AgCl) | 1000 mV | 830 mV | 704 mV | 589 mV | 579 mV | 601 mV | 528 mV |

The final reaction mixture, which consisted of 1300 ml pulp, was filtered; 940 ml of filtrate was recovered with 4.8 g/l Ni and 0.55 g/l Co, 27.4 g/l Fe and 25 g/l $H_2SO_4$. The filter cake was washed over a filter and dried at a constant weight. 356 g dry residue was recovered.

The leaching yields were: 87.3% for Ni, 95.3% for Co and 26% for Fe.

Test No. 3: Version 1—Leaching Limonite and Saprolite at a Ratio of 1:1

A mixture of 269 g dry limonite and 281 g dry saprolite was added to 1620 ml sea water containing 11 g/l Na in the same reactor as before and stirred under the same conditions. 500 g 96% sulphuric acid were slowly added to the ore mixture in the form of pulp, that is to say 0.87 g $H_2SO_4$/g dry ore.

The reaction medium was brought to a temperature between 95° C. and the boiling point for the duration of the test. After 15 minutes of reaction, the potential of the pulp was checked at approximately 650 mV Ag/AgCl at most by adding $SO_2$ for approximately 5 hours. The evolution of potential was as follows:

|  | Time | | |
| --- | --- | --- | --- |
|  | 0.8 h | 4.5 h | 23.3 h |
| Potential (Ag/AgCl) | 645 mV | 543 mV | 528 mV |

The final reaction mixture, which consisted of 1920 ml pulp, was then filtered; 1355 ml of filtrate was recovered with 4.6 g/l Ni and 0.46 g/l Co, 21.4 g/l Fe and 36 g/l $H_2SO_4$. The filter cake was washed over a filter and dried at a constant weight. 475 g dry residue, that is to say 0.86 g dry residue/g dry ore was recovered.

The leaching yields were: 93.6% for Ni, 96.7% for Co and 24% for Fe.

Test No. 4: Version 1—Leaching Limonite and Saprolite at a Ratio of 1:2

A mixture of 135 g dry laterite and 270 g dry saprolite was added to 1215 ml sea water containing 11 g/l Na in the same reactor as before and stirred under the same conditions. 375 g 96% sulphuric acid were slowly added to the ore mixture in the form of a pulp, that is to say 0.89 g $H_2SO_4$/g dry ore.

The reaction medium was brought to a temperature between 95° C. and the boiling point for the duration of the test. After 15 minutes of reaction, the potential of the pulp was checked at approximately 650 mV Ag/AgCl at most by adding $SO_2$ for approximately 5 hours. The evolution of the potential was as follows:

|  | Time | | |
| --- | --- | --- | --- |
|  | 0 h | 1.5 h | 17.8 h |
| Potential (Ag/AgCl) | 943 mV | 586 mV | 575 mV |

The reaction mixture, which consisted of 1500 ml pulp, was then filtered; 1080 ml of filtrate was recovered with 4.3 g/l Ni and 0.33 g/l Fe and 30 g/l $H_2SO_4$. The filter cake was washed over a filter and dried at a constant weight. 288 g dry residue, that is to say 0.71 g dry residue/g dry ore was recovered.

The leaching yields were: 89.0% for Ni, 93.9% for Co and 34% for Fe.

Test No. 5: Version 2—Leaching Limonite and Saprolite at a Ratio of 1:2

First Step:

A mixture of 141 g dry laterite and 139 g dry saprolite was added to 810 ml sea water containing 11 g/l Na in the same reactor as before and stirred under the same conditions. 363 g 96% sulphuric acid were slowly added to the ore mixture in the form of a pulp, that is to say 1.24 g $H_2SO_4$/g dry ore relative to the amount of initial ore.

The reaction medium was brought to a temperature between 95° C. and the boiling point for the duration of the test. After 15 minutes of reaction, the potential of the pulp was checked at approximately 650 mV Ag/AgCl at most by adding $SO_2$ for approximately 5 hours. The evolution of the potential was as follows:

|  | Time | | | | |
| --- | --- | --- | --- | --- | --- |
|  | 0 h | 0.5 h | 0.7 h | 0.9 h | 1.5 h | 5.7 h |
| Potential (Ag/AgCl) | 1026 mV | 1090 mV | 880 mV | 792 mV | 623 mV | 629 mV |

The first step lasted for 5.7 h.

The reaction mixture, which consisted of 1092 ml pulp, was:
either filtered; 900 ml of filtrate was recovered with 4.2 g/l Ni and 0.43 g/l Co, 71 g/l Fe and 30 g/l $H_2SO_4$. The filter cake was washed over a filter and dried at a constant weight. 86 g dry residue, that is to say 0.31 g dry residue/g dry ore was recovered. The results of the first step were then assessed. The leaching yields were: 97.7% for Ni, 97.9% for Co and 94% for Fe.
or used in a second step.

Second Step:

At t=5.7 h, the reaction mixture was neutralised by adding 139 g dry saprolite made into a pulp in 405 ml sea water. The medium was heated until the test ended at t=23.8 h. No additional acid was added which means that if the total amount of ore added during the two steps is considered, the amount of acid introduced at the start of the test was 0.83/g dry ore.

The final redox potential was 574 mV Ag/AgCl.

The reaction mixture, which consisted of 1590 ml pulp, was filtered; 1080 ml filtrate was recovered with 5.7 g/l Ni, 0.40 g/l Co, 4.9 g/l Fe and 25 g/l $H_2SO_4$. The filter cake was washed over a filter and dried at a constant weight. 400 g dry residue, that is to say 0.95 g dry residue/g dry ore was recovered.

The leaching yields were: 93.8% for Ni, 95.5% for Co and 8% for Fe.

If the evolution of the various reactions concerned is monitored during the leaching process in test no. 2, the following conclusions are made with regard to the course of a leaching process.

Magnesium is leached extremely quickly (90% is leached in the first hour) and consumes a significant portion (40%) of the acid introduced at the start. The amount leached increases only slightly hereinafter (final yield 95%).

Iron is leached quickly but reaches a maximum leaching yield of 48% after 3 h, that is to say a consumption of the acid introduced of 33%. This yield decreases thereafter owing to iron precipitation in the jarosite until it reaches a final value of 26% which is obtained after approximately 15 h. The curve showing the evolution of the iron content in the solution can be seen in FIG. 3.

73% of the nickel is leached within 1 h. Leaching then takes place slowly so as to obtain a final yield of 87% after 16 h.

Cobalt is leached extremely quickly (90% within 1 h) after adding $SO_2$. The maximum yield of 95% is obtained after approximately 10 h.

$H_2SO_4$ content after 1 h is 35 g/l and decreases to 17 g/l after 3 h. Acidity then increases continuously over the course of jarosite precipitation. This releases acid which then becomes available to leach the ore which translates into the continuous leaching of the nickel. The maximum value of $H_2SO_4$ content is 28 g/l which is obtained after approximately 15 h. It then continuously reduces again to 25 g/l after 28 h. The curve can be seen in FIG. 4.

Reference Tests 1 and 2

Reference tests were also carried out using the process known as JAL (jarosite atmospheric leaching) which is the subject-matter of documents U.S. Pat. No. 6,261,527 and U.S. Pat. No. 6,680,035.

According to this process, in a first step limonite alone, which has been made into a pulp with sea water, is leached at atmospheric pressure and potential is checked by adding a reducing agent; in a second step the pulp is neutralised using only saprolite.

In these reference tests, 0.80 g $H_2SO_4$ was added per g ore (total of limonite+saprolite) and a limonite/saprolite ratio of 1:1 was used. In this respect, conditions were used which are comparable to those used in tests 1 and 2 according to the invention. Reference test 1 was carried out for 13.3 h whilst reference test 2 was carried out for 24 h.

The results of reference tests 1 and 2 and tests 1 to 5 according to the invention are summarised in table 3.

In all cases, good yields of approximately from 92 to 98% were obtained by leaching cobalt. The process according to the invention yields results which are extremely comparable to those of the reference JAL process. This is owing to the fact that the process for leaching cobalt depends rather strongly on the introduction of a manganese reducing agent with which the cobalt is associated. In this case it was $SO_2$ both in the reference tests and in the tests according to the invention.

With regard to the process for leaching nickel, the yields are fairly comparable (approximately 90% for all the tests). When the limonite/saprolite ratio is 1:1, version 1 of the process according to the invention provides a yield of approximately 87% with acidity of approximately 0.80 g/g and thus yields a result a little lower than those of the reference tests but with equal acidity. With a higher acidity of approximately 0.90 g/g, a yield comparable to those of the reference tests is obtained. If the limonite/saprolite ratio is increased to 1:2 with equal acidity, the yield obtained by leaching nickel decreases slightly in the case of version 1 of the process according to the invention.

However, if version 2 of the process according to the invention is followed with a limonite/saprolite ratio of 1:2, even with acidity of only approximately 0.80 g/g, a very high yield of approximately 94% is obtained by leaching nickel.

The invention thus makes it possible with version 1 and, above all, version 2 to obtain results from leaching nickel which are only slightly worse or are quite comparable to those obtained using the conventional JAL process, with an identical composition of the ores treated and an identical amount of acid consumed.

TABLE 3 results of tests 1 to 5 and reference tests 1 and 2

| Test no. | Process tested | Number of steps in the leaching process | Limonite/ saprolite ratio | Treated ores (in units of weight) | | | Acid/ore equivalent |
|---|---|---|---|---|---|---|---|
| | | | | Steps | Limonite | saprolite | |
| Ref 1 | JAL | 2 | 1:1 | No. 1 | 1 | | 1.60 g/g |
| | | | | No. 2 | | 1 | =0.80 g/g total |
| Ref 2 | JAL | 2 | 1:1 | No. 1 | 1 | | 1.60 g/g |
| | | | | No. 2 | | 1 | =0.80 g/g total |
| No. 1 | Invention version 1 | 1 | 1:1 | — | 1 | 1 | 0.77 g/g total |
| No. 2 | Invention, version 1 | 1 | 1:1 | — | 1 | 1 | 0.80 g/g total |
| No. 3 | Invention, version 1 | 1 | 1:1 | — | 1 | 1 | 0.87 g/g total |
| No. 4 | Invention, version 1 | 1 | 1:2 | — | 1 | 2 | 0.89 g/g total |
| No. 5 | Invention, version 2 | 2 | 1:2 | No. 1 | 1 | 1 | 1.25 g/g |
| | | | | No. 2 | | 1 | =0.83 g/g total |

| Test no. | Retention time of each step and total retention time of the test (h) | Temperature (° C.) | Total yields | | Final acidity | Residual Fe |
|---|---|---|---|---|---|---|
| | | | Ni yield* | Co yield | | |
| Ref 1 | 5.3 h | 100° C. | 99.5% | 99.3% | 66 g/l | 120 g/l |
| | +8 h = 13.3 h | 100° C. | 91.7% | 96.9% | 28 g/l | 7.5 g/l |
| Ref 2 | 5.8 h | 100° C. | 99.5% | 99.0% | 68 g/l | 143 g/l |
| | +18.2 h = 24 h | 100° C. | 93.1% | 92.7% | 34 g/l | 5.4 g/l |
| No. 1 | 24 h | 100° C. | 86.6% | 92.4% | 39 g/l | 7.7 g/l |
| No. 2 | 28 h | 100° C. | 87.3% | 95.3% | 25 g/l | 27.4 g/l |
| No. 3 | 23.3 h | 100° C. | 93.6% | 96.7% | 36 g/l | 21.4 g/l |
| No. 4 | 17.8 h | 100° C. | 89.0% | 93.9% | 30 g/l | 23.6 g/l |
| No. 5 | 5.7 h | 100° C. | 97.7% | 97.9% | 30 g/l | 71 g/l |
| | +18.1 h = 23.8 h | | 93.8% | 95.5% | 25 g/l | 4.9 g/l |

*For ref test 1 and ref test 2 as well as test no. 5, the Ni yield indicated in step no. 2 is the total yield of the test, calculated based on the total amount of ore introduced during the two steps.

Remarkably, these results were obtained without it being necessary to first separate the limonite and saprolite in order to carry out the first or only step of the leaching process. This is a substantial advantage from a cost point of view compared with the JAL process in general for lateritic deposits having a considerable amount of saprolite and, in particular, for those where selective mining or separating the limonite and saprolite fractions by means of mineral processing is not possible or too expensive.

With regard to the presence of residual iron in the final solution, the results obtained with the process according to the invention in tests 1 to 5 seem relatively inconsistent at first glance. The iron content tends to increase with the amount of acid introduced (between 5 and 8 g/l Fe for 0.77 to 0.83 g/g $H_2SO_4$ introduced, between 21 and 24 g/l Fe for 0.87 to 0.89 g/g $H_2SO_4$ introduced) but it is noted that test 2 (0.80 g/g $H_2SO_4$) resulted in a rather high Fe content of 27.4 g/l despite the amount of $H_2SO_4$ being only 0.80 g/g.

This finding is explained in that the precipitation rate of jarosite is extremely dependent on the presence or absence of jarosite-containing seeds at the start of the leaching process. In fact, the reactor had in fact been cleaned extremely carefully before test 2 began. Jarosite seeds of this type were thus totally absent from the starting medium whilst this was probably not the case with the other tests according to the invention, which is what would most frequently be the case in industrial practice.

Based on this finding, new tests were therefore carried out so as to study the influence of deliberately adding jarosite seeds to the pulp before the leaching process.

These tests were carried out in accordance with version 1 of the process according to the invention where the leaching process is carried out in a single step. However, the results can also be applied to version 2 which comprises leaching in two steps with an intermediate addition of saprolite.

Two tests numbered 6 and 7 were carried out in conditions comparable to those of test 2 above with regards to the version of the process used (version 1), the limonite/saprolite ratio (1:1) and the amount of $H_2SO_4$ added (approximately 0.80 g per g dry ore). Unlike in test 2, before leaching began, jarosite residue seeds were added to the pulp at a seed/dry ore ratio of 1:6 (test 6) or 1:2 (test 7). The speed of rotation of the reactor was also increased in order to promote dispersion of the seeds. The conditions for tests 2 (as a reminder), 6 and 7 are summarised in Table 4.

TABLE 4

Operating conditions for the second set of tests

| Test | Process | Approximate limonite/saprolite ratio | $H_2SO_4$ added (g/g dry ore) | seed/dry ore | Stirring rpm |
|---|---|---|---|---|---|
| 2 | Version | 1:1 | 0.80 | 0 | 318 |
| 6 | 1 | 1:1 | 0.84 | 1/6 (0.17) | 538 |
| 7 | — | 1:1 | 0.80 | 1/2 (0.50) | 515 |

Test No. 6—Version 1—Leaching Limonite and Saprolite at a Ratio of 1:1 with 0.17 g Seeds/g Ore A mixture of 260 g dry limonite, 258 g dry saprolite and 88 g jarosite residue seeds was added to 1580 ml seawater containing 11 g/l Na in the same reactor as before. 450 g 96% sulphuric acid were slowly added to the ore mixture in the form of a pulp, that is to say 0.84 g $H_2SO_4$/g dry ore. The reactor was equipped with a system for outgassing sulphur dioxide and a system for measuring redox potential and was set in rotation at 538 rpm.

The reaction medium was brought to a temperature between 95° C. and the boiling point for the duration of the test. After 15 minutes, the potential of the pulp was checked at approximately 650 mV Ag/AgCl at most by adding $SO_2$ for approximately 5 hours. The evolution of potential was as follows:

| | Time | | | | | | |
|---|---|---|---|---|---|---|---|
| | 0 h | 0.5 h | 1.0 h | 2.0 h | 4.0 h | 7.9 h | 24.4 h |
| Potential (Ag/AgCl) | 936 mV | 757 mV | 691 mV | 628 mV | 622 mV | 621 mV | 588 mV |

Regular samples of approximately 50 ml pulp were taken every hour. The samples were immediately filtered and the filter cakes were washed. The filtrates, washes and washed filter cakes were analysed.

The final reaction mixture was filtered; 990 ml filtrate was recovered with 4.5 g/l Ni and 0.50 g/l Co, 11.2 g/l Fe and 36 g/l $H_2SO_4$. The filter cake was washed over a filter and dried at a constant weight. 484 g dry residue was recovered, that is to say with the addition of 88 g seeds at the start: 0.77 g new residue/g ore.

The leaching yields were: 93.7% for Ni, 96.5% for Co and 9.6% for Fe.

Test No. 7—Version 1—Leaching Limonite and Saprolite at a Ratio of 1:1 with 0.50 g Seeds/g Ore A mixture of 333 g dry limonite, 333 g dry saprolite and 333 g jarosite residue seeds was added to 2000 ml seawater containing 11 g/l Na in the same reactor as before. 556 g 96% sulphuric acid were slowly added to the ore mixture in the form of a pulp, that is to say 0.80 g of $H_2SO_4$/g dry ore. The reactor was equipped with a system for outgassing sulphur dioxide and a system for measuring redox potential and was set in rotation at 515 rpm.

The reaction medium was brought to a temperature between 95° C. and the boiling point for the duration of the test. After 15 minutes, the potential of the pulp was set to approximately 650 mV Ag/AgCl at most by adding $SO_2$ for approximately 5 hours. The evolution of potential was as follows:

| | Time | | | | | |
|---|---|---|---|---|---|---|
| | 0.2 h | 0.5 h | 1.0 h | 2.1 h | 8.0 h | 24.3 h |
| Potential (Ag/AgCl) | 1050 mV | 808 mV | 623 mV | 625 mV | 591 mV | 551 mV |

Regular samples of approximately 50 ml pulp were taken every hour. The samples were immediately filtered and the filter cakes were washed. The filtrates, washes and washed filter cakes were analysed.

The final reaction mixture, which consisted of 2135 pulp, was filtered; 1227 ml filtrate was recovered with 4.8 g/l Ni and 0.51 g/l Co, 7.6 g/l Fe and 42 g/l $H_2SO_4$. The filter cake was washed over a filter and dried at a constant weight. 839 g dry residue was recovered, that is to say with the addition of 333 g seeds at the start: 0.76 g new residue/g ore.

The leaching yields were: 97.1% for Ni, 94.6% for Co and 5.3% for Fe.

Monitoring the evolutions of the reaction media during the leaching process gave rise to the following conclusions:

The presence of seeds substantially improves the leaching yield of Ni and accelerates the rate of said leaching process, increasingly so the greater the amount of seeds added.

In test 2, after one hour 72% Ni had been leached compared with 75% in test 6 and 88% in test 7. For test 7, 92.9% was obtained in only 2 h whilst this amount could not be obtained with test 2 even after 24 h. In test 7, after 8 h 96% had been obtained and 97% after 24 h which is excellent and higher than the amount obtained with the reference tests using the JAL process. After 24 h, a yield of 93.7% was obtained with test 6 which was therefore just as good as that obtained with the JAL reference tests.

The results of the process for leaching cobalt are comparable in the three tests (94 to 96% obtained after two hours) for the same reasons which were seen for the set of tests 1 to 5. Results which were similar to those of the JAL reference tests were therefore obtained.

The rate of the process for leaching magnesium is quick in all cases (from 88 to 92% after one hour). After 24 hours, leaching rates of approximately 95% in all cases were obtained. Introducing seeds certainly had no significant effect on this.

Figure 3:
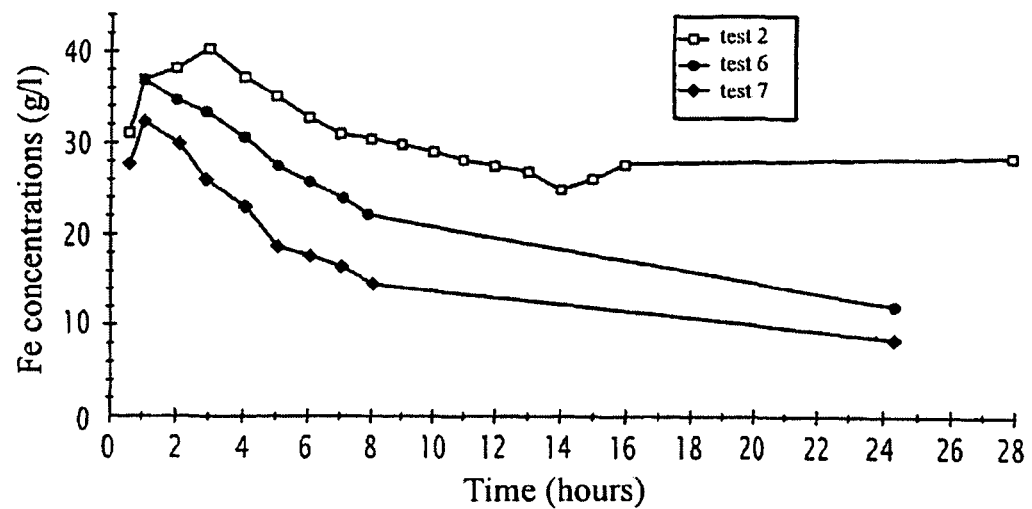
FIG. 3 shows the evolution of the iron content in the liquid fraction of the pulp during three leaching tests.

FIG. 3 shows the evolution of iron concentration in the liquid fraction of the pulp during tests 2, 6 and 7. It can be seen that after an initial partial dissolution of the iron in the ore, the rate of iron precipitation in the jarosite depends largely on the amount of seeds introduced.

In the absence of seeds (test 2), the iron only starts to precipitate after having dissolved after approximately 3 h and the iron concentration in the solution reaches its minimum value of 27.4 g/l after 16 h, which is maintained until the end of the experiment (28 h).

With 0.17 g/g seeds added (test 6), the iron precipitates after having dissolved after approximately one hour and precipitation is observed until an iron content of 11.2 g/l is obtained after 24.4 h.

With 0.5 g/g seeds added (test 7), the iron again precipitates after having dissolved after approximately 1 h. After only 8 h, a relatively low level of iron in the solution of 14 g/l has already been obtained. After 24.3 h this level is only 7.6 g/l which is thus comparable to that obtained with the reference JAL tests, These experiments clearly show that the deliberate introduction of jarosite seeds before the leaching process rather substantially accelerates the rate of jarosite precipitation and makes it possible to obtain a final solution, before liquid-solid separation, having a low iron content with treatment times which are not excessively long.

Figure 4:
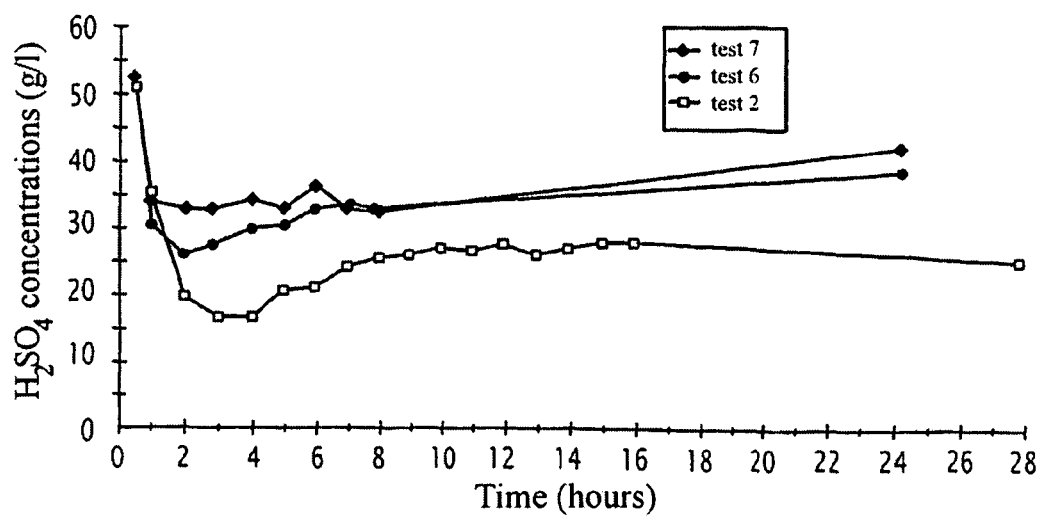
FIG. 4 shows the evolution of the free $H_2SO_4$ content in the liquid fraction of the pulp during the same tests.

FIG. 4 shows the evolution of the free $H_2SO_4$ content in the liquid fraction of the pulp during the tests. The leaching process starts in a rather acidic medium and the dissolution of the ore components quickly consumes the acid initially introduced. This consumption competes with the release of acid which is caused, in particular, by jarosite precipitation. It is therefore normal for the qualitative evolution of the curves of the free $H_2SO_4$ content to substantially, but inversely, follow the qualitative evolution of the curves of the iron content in FIG. 3.

In the absence of jarosite seeds (test 2), acidity rapidly decreases until 3 to 4 h of the test, then continuously increases until reaching a plateau of approximately 28 g/l after 15 h. The final content after 28 h is 25 g/l.

With 0.17 g/g jarosite seeds (test 6), acidity stops decreasing after 2 h and continuously increases during jarosite precipitation until reaching 36 g/l after 24 h. With 0.50 g/g jarosite seeds (test 7), a similar evolution is observed until a final content of 42 g/l is obtained after 24.3 h.

Acidity at the start of the test is lower, the greater the amount of seeds introduced. With the introduction of seeds the availability of free acid for leaching the ore is therefore largely promoted and this explains the higher leaching yields of nickel which are seen in tests 6 and 7 relative to test 2, with a comparable amount of acid introduced. The user must thus choose between two solutions and their compromises:
  either benefit from the introduction of seeds to reduce the amount of acid introduced with a view to obtaining an identical leaching yield of nickel;
  or keep the amount of acid introduced the same as in the absence of seeds and at the end obtain a greater amount of nickel than that obtained in the absence of seeds owing to the increased leaching yield.

Taking into account the price of metals, mining costs, the cost of consumable materials, the equipment investment and maintenance, a cost calculation enables the user to select the solution which is best adapted to the specific case, in particular based on the features of the deposit which he must evaluate.

It has also been found that introducing jarosite seeds makes it possible to increase aluminium and chrome precipitation together with that of iron, sulphur and sodium. These two elements are thus found in smaller quantities in the final solution. The presence of these elements as impurities in the nickel and cobalt intermediate concentrates or commercial products obtained from this solution will thus be reduced or else their subsequent elimination will be facilitated.

Generally, supplementing the process according to the invention, in its two versions, by adding jarosite seeds to the limonite and saprolite pulp before the leaching process thereof makes it possible to obtain results with the process according to the invention which are just as good as those obtained with the JAL process, without having to first separate the limonitic fraction and the saprolitic fraction of the ore, thus reducing costs. The jarosite seeds used preferably result from a solid-liquid separation process carried out on a fraction of the leached pulp obtained during implementation of the process itself in such a way that it is not necessary to introduce any external matter into the process in order to benefit from this improvement.

The invention claimed is:
1. Process for the hydrometallurgical treatment of a lateritic nickel/cobalt ore consisting of a mixture of limonite and saprolite, consisting of the steps wherein:
  the limonite and saprolite mixture is made into a pulp in the presence of an iron-precipitating agent so as to form an initial pulp having a solids content of between 10 and 40% by weight;
  the initial limonite and saprolite pulp, including the mixture of limonite and saprolite, undergoes a leaching process with sulphuric acid at a temperature between 70° C. and the boiling point of the solution at atmospheric pressure to obtain a subsequent pulp from the leaching process;
  and a solid-liquid separation process is carried out on said subsequent pulp from the leaching process so as to obtain an iron-containing solid residue, which is mainly in jarosite form, and a solution containing nickel and cobalt ions.

2. Process according to claim 1, wherein the saprolite/limonite ratio of the mixture is between 0.5 and 3.

3. Process according to claim 1, wherein the retention time of the pulp during the leaching process with sulphuric acid is between 1 and 24 h.

4. Process according to claim 1, wherein the amount of sulphuric acid added when the pulp is leached is such that the concentration of sulphuric acid in the pulp at the end of the leaching process is from 10 to 50 g/l.

5. Process for the hydrometallurgical treatment of a lateritic nickel/cobalt ore consisting of a mixture of limonite and saprolite, consisting of the steps wherein:
the limonite and saprolite mixture is made into a pulp in the presence of an iron-precipitating agent so as to form an initial pulp having a solids content of between 10 and 40% by weight;
the initial limonite and saprolite pulp, including the mixture of limonite and saprolite, undergoes a first step of the leaching process with sulphuric acid at a temperature between 70° C. and the boiling point of the solution at atmospheric pressure to obtain a subsequent pulp from the first step of the leaching process, wherein the saprolite/limonite ratio of the mixture makes it possible, after the first step of the leaching process, to obtain a concentration of sulphuric acid of from 25 to 50 g/l;
an amount of saprolite is separately made into a saprolite pulp having a solids content of between 10 and 40% by weight, in that the saprolite pulp is then added to the saprolite and limonite pulp during the leaching process so as to proceed with a second step of said leaching process for between 5 and 8 h, at a temperature between 70° C. and the boiling point of the solution, the concentration of sulphuric acid in the subsequent pulp after the second step of the leaching process being between 10 and 50 g/l,
and a solid-liquid separation process is carried out on said subsequent pulp from the leaching process so as to obtain an iron-containing solid residue, which is mainly in jarosite form, and a solution containing nickel and cobalt ions.

6. Process according to claim 5, wherein the retention time of the initial limonite and saprolite pulp during the first step of the leaching process is between 1 h and 8 h.

7. Process according to claim 1 or claim 5, wherein the leaching process is carried out in the presence of a reducing agent, keeping electrochemical potential less than or equal to 1,000 mV relative to the standard hydrogen electrode.

8. Process according to claim 1 or claim 5, wherein the process for leaching the limonite and saprolite pulp is carried out in the presence of jarosite seeds.

9. Process according to claim 8, wherein the seeds/ore ratio is greater than 0 and less than or equal to 2.

10. Process according to claim 8, wherein said seeds are formed by the solid fraction obtained during the solid-liquid separation of some of the pulp obtained by said leaching process.

11. Process according to claim 10, wherein said solid fraction obtained by said separation process has a solids content of at least 30%.

12. Process according to claim 11, wherein said seeds are obtained by filtering said solid fraction obtained by said separation process.

13. Process according to claim 1 or claim 5, wherein the iron-precipitating agent is selected from the group consisting of $Na^+$, $K^+$ and $NH_4^+$.

14. Process according to claim 13, wherein the iron-precipitating agent is added at least in part by sea water used for making the limonite and saprolite mixture into a pulp and/or in order to make saprolite into a pulp.

15. Process for the hydrometallurgical treatment of a lateritic nickel/cobalt ore according to claim 1 or claim 5 wherein the limonite and saprolite mixture is made into a pulp in the presence of an iron-precipitating agent so as to form an initial pulp having a solids content of between 20 and 30% by weight.

16. Process for the hydrometallurgical treatment of a lateritic nickel/cobalt ore according to claim 1 or claim 5, wherein the initial limonite and saprolite pulp undergoes a leaching process with sulphuric acid at a temperature between 90° C. and the boiling point, at atmospheric pressure.

17. Process for the hydrometallurgical treatment of a lateritic nickel/cobalt ore according to claim 1 or claim 5, wherein the solid-liquid separation process is carried out on said pulp by decantation and counter current washing or filtration.

18. Process according to claim 1 or claim 5, wherein the amount of sulphuric acid added when the pulp is leached is such that the concentration of sulphuric acid in the pulp at the end of the last leaching process is from 20 to 40 g/l.

19. Process according to claim 5, wherein the retention time of the initial limonite and saprolite pulp during the first step of the leaching process is between 4 to 6 h.

20. Process according to claim 7, wherein the reducing agent is $SO_2$.

21. Process according to claim 8, wherein the seeds/ore ratio is between 0.2 and 0.6.

22. Process according to claim 10 wherein said seeds are formed by the solid fraction obtained during the solid-liquid separation of some of the pulp obtained by said leaching process in a decanter.

23. Process according to claim 3 wherein the retention time of the pulp during the leaching process with sulphuric acid is between 6 to 12 h.

24. Process according to claim 9 wherein the seeds/ore ratio is between 0.2 and 0.6.

25. Process for preparing nickel and/or cobalt intermediate concentrates or commercial products from a lateritic ore, comprising the steps wherein:
the hydrometallurgical treatment of said lateritic ore is carried out by steps wherein,
the limonite and saprolite mixture is made into a pulp in the presence of an iron-precipitating agent so as to form an initial pulp having a solids content of between 10 and 40% by weight;
the initial limonite and saprolite pulp, including the mixture of limonite and saprolite, undergoes a leaching process with sulphuric acid at a temperature between 70° C. and the boiling point of the solution at atmospheric pressure to obtain a subsequent pulp from the leaching process;
and a solid-liquid separation process is carried out on said subsequent pulp from the leaching process so as to obtain an iron-containing solid residue, which is mainly in jarosite form, and a solution containing nickel and cobalt ions; and
said solution containing nickel and cobalt ions undergoes additional steps to purify and recover the nickel and/or cobalt from the solution in the form of intermediate concentrates or commercial products.

26. Process for the hydrometallurgical treatment of a lateritic nickel/cobalt ore consisting of a mixture of limonite and saprolite, consisting of the steps wherein:

the limonite and saprolite mixture is made into a pulp in the presence of an iron-precipitating agent so as to form an initial pulp having a solids content of between 10 and 40% by weight;

the initial limonite and saprolite pulp, including the mixture of limonite and saprolite, undergoes a first step of the leaching process with sulphuric acid at a temperature between 70° C. and the boiling point of the solution at atmospheric pressure to obtain a subsequent pulp from the first step of the leaching process;

an amount of saprolite is separately made into a pulp having a solids content of between 20 and 30% by weight, and is then added to the saprolite and limonite pulp during the leaching process so as to proceed with a second step of said leaching process for between 5 and 8 h, at a temperature between 90° C. and the boiling point, the concentration of sulphuric acid in the subsequent pulp after the second step of the leaching process being between 20 and 40 g/l;

and a solid-liquid separation process is carried out on said subsequent pulp from the leaching process so as to obtain an iron-containing solid residue, which is mainly in jarosite form, and a solution containing nickel and cobalt ions.

27. Process for the hydrometallurgical treatment of a lateritic nickel/cobalt ore consisting of a mixture of limonite and saprolite, consisting of the steps wherein:

the limonite and saprolite mixture is made into a pulp in the presence of an iron-precipitating agent so as to form an initial pulp having a solids content of between 10 and 40% by weight;

the initial limonite and saprolite pulp, including the mixture of limonite and saprolite, undergoes a leaching process with sulphuric acid at a temperature between 70° C. and the boiling point of the solution at atmospheric pressure to obtain a subsequent pulp from the leaching process;

the subsequent pulp obtained from the leaching process undergoes a neutralization process so as to have a pH between 2 and 3;

and a solid-liquid separation process is carried out on said subsequent pulp from the leaching process so as to obtain an iron-containing solid residue, which is mainly in jarosite form, and a solution containing nickel and cobalt ions.

\* \* \* \* \*